(12) United States Patent
Giolando

(10) Patent No.: US 6,416,814 B1
(45) Date of Patent: Jul. 9, 2002

(54) VOLATILE ORGANOMETALLIC COMPLEXES OF LOWERED REACTIVITY SUITABLE FOR USE IN CHEMICAL VAPOR DEPOSITION OF METAL OXIDE FILMS

(75) Inventor: Dean M. Giolando, Toledo, OH (US)

(73) Assignee: First Solar, LLC, Toledo, OH (US)

( * ) Notice: Subject to any disclaimer, the term of this patent is extended or adjusted under 35 U.S.C. 154(b) by 18 days.

(21) Appl. No.: 09/732,233

(22) Filed: Dec. 7, 2000

(51) Int. Cl.$^7$ ................................................. C23C 16/18
(52) U.S. Cl. ............. 427/166; 427/255.19; 427/255.33; 427/255.35; 427/255.36; 427/255.39; 65/60.5; 65/60.52
(58) Field of Search ............................ 427/166, 255.19, 427/255.31, 255.33, 255.35, 255.36, 255.391; 65/60.5, 60.52

(56) References Cited

U.S. PATENT DOCUMENTS 4,751,149 A    6/1988   Vijayakumar et al.

FOREIGN PATENT DOCUMENTS

| GB | 1187783 | 4/1970 |
| GB | 1187784 | 4/1970 |
| WO | WO98/06675 | 2/1998 |

OTHER PUBLICATIONS

R.C. Paul, R. Dev and J.L. Vashisht, "Ethyl Formated as a Polar Solvent: Part II–Nature of Solutions of Lewis Acids in Ethyl Formate," Indian J. Chem., vol. 7, Apr. 1998, pp. 377–380.

Primary Examiner—Timothy Meeks
(74) Attorney, Agent, or Firm—Fish & Richardson P.C.

(57) ABSTRACT

Novel ligated compounds of tin, titanium, and zinc are useful as metal oxide CVD precursor compounds without the detriments of extreme reactivity yet maintaining the ability to produce high quality metal oxide coating by contact with heated substrates.

12 Claims, No Drawings

VOLATILE ORGANOMETALLIC COMPLEXES OF LOWERED REACTIVITY SUITABLE FOR USE IN CHEMICAL VAPOR DEPOSITION OF METAL OXIDE FILMS

TECHNICAL FIELD

The present invention pertains to the field of chemical vapor deposition of tin, titanium, and zinc oxides onto glass and other substrates, and to tin, titanium and zinc compounds useful therefor.

BACKGROUND ART

Tin oxide, titanium oxide, and zinc oxide films have been applied to glass substrates for a variety of purposes, notably as infrared absorbing coatings, and as transparent conductive electrodes for use in such devices as photovoltaic cells and dimmable mirror assemblies. In such applications, the physical, electrical, and optical characteristics of the metal oxide films are often critical. Among these characteristics are coating thickness, uniformity, smoothness, electrical conductivity or resistivity, spectral transmission, and optical clarity.

Tin oxide films have become commonplace. However, most applications involving $SnO_2$ films are relatively high product volume applications which require that the chemical vapor deposition (CVD) precursor tin compounds be inexpensive, and preferably stable. For titanium oxide and zinc oxide films, similar considerations apply. Thus, despite their ability to provide high quality films, numerous organometallic compounds of tin, titanium, and zinc cannot be used, either because they are too expensive or because of the dangers associated with use of highly flammable and toxic compounds in a commercial industrial setting.

Tin oxide and titanium oxide films have been prepared by contacting separate carrier gas streams containing tin tetrachloride or titanium tetrachloride and either water or an oxygen-containing compound which reacts with the metal halide at elevated temperatures. The streams are contacted with each other physically close to the substrate onto which the coating is to be deposited. These methods have not proven to be totally satisfactory, even though the tin halide/water reaction is widely used. Tin tetrachloride and titanium tetrachloride are volatile and highly reactive. However, the greatest difficulty with the use of metal halide/water to form metal oxide films is the formation of a fine dust or powder of tin oxide particulates in addition to the coherent metal oxide coating. The presence of these oxide particles necessitates the frequent shut down and cleaning of the coating apparatus.

For zinc oxide coating, dialkylzinc compounds have been used in conjunction with an oxidant such as water or an oxygen-containing organic compound, as disclosed in Vijayakumar et al. U.S. Pat. No. 4,751,149. Dialkylzinc compounds are highly reactive and spontaneously flammable in air. They react explosively with water. Thus, their use in large scale coating is highly problematic from a safety standpoint. Moreover, employing two separate reagent streams and allowing them to combine and react adjacent the substrate again produces particulates as well as the desired coherent film.

The foregoing methods have the additional disadvantage that the compositional nature of the film may change due to factors such as carrier gas flow, pressure, and temperature, as well as the concentration of the reactive ingredient in the carrier gas streams. With a constant ratio of reactive ingredients, films with relatively constant stoichiometry but varying smoothness and thickness may result due to variations in the foregoing carrier gas parameters. If the reactant ratios also vary, films of different stoichiometry, electrical, and optical properties will result. Examples of tin and titanium oxide films with varying properties prepared by different ratios of tin or titanium tetrachloride and organic carboxylic acid esters in separate gas streams is given in PCT published application WO 98/06675.

Use of single component tin oxide, titanium oxide, or zinc oxide CVD precursor systems requiring but one supply stream has thus far not met with success, either because of the cost of the organometallic precursors, or because the desired film thickness and uniformity cannot be achieved. In non-critical applications such as the surface modification of tempered hot glass, solutions of tin and titanium compounds dissolved in organic solvent have been used, the organic solvent also functioning as a potential oxidizing agent. Examples of tin and titanium oxide coatings to strengthen molded glassware, and formed by applying solutions of tin or titanium halide in excess organic esters of acetic, propionic, or butyric acids are given in Great Britain Patents GB 1,187,784 (1967; tin) and GB 1,187,783 (1967; titanium). The use of excess organic solvent renders these processes less ecologically desirable today. Moreover, application of the solutions by spraying renders precise control of film physical, chemical, and electrooptical parameters virtually impossible, and encourages carbon contamination. Thus, such coatings cannot be used for products such as dimmable mirrors and photovoltaic cells.

DISCLOSURE OF INVENTION

It has now been surprisingly discovered that novel ligated compounds of tin, titanium, and zinc can be used to prepare uniform, high quality metal oxide coatings on glass and other substrates without the use of separate reactant streams and without application in the form of a solution. These tin, titanium, and zinc compounds have exhibited high relative stability as compared to precursors such as tin tetrachloride, titanium tetrachloride and dialkylzinc.

BEST MODE FOR CARRYING OUT THE INVENTION

The tin and zinc compounds of the present invention have the formula $MX_nL_2$ where M is Sn or Zn and L is a $C_{1-4}$ alkylformate, preferably ethylformate; X is Cl and n is 4 when M is Sn; and X is $C_{1-4}$ lower alkyl and n is 2, when M is Zn, with the proviso that when M is Sn, the ethylformate ligands are preferably positioned cis to each other. The preferred chemical vapor deposition compounds are

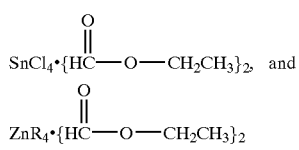

where R is $-CH_3$ or $-CH_2CH_3$. As will be discussed infra, these compounds are well characterized, easily synthesized, and form excellent coatings. The zinc compounds are far more stable then dialkylzinc compounds previously used to produce zinc oxide coatings; for example, rather than react explosively with water, they slowly react, liberating alkane gas in the process. The compounds are low melting solids or liquids which can easily accept dopant compounds, allowing a means of providing a stable, constant concentration of dopant atoms to the coating process rather than employ a yet further stream of dopant compound. Examples of $C_{1-4}$ alkyl groups in the alkyl formates include methyl, ethyl, n-propyl, i-propyl, n-butyl, i-butyl, and t-butyl alkyl groups.

Thus, in general, the tin and zinc compounds have the formula:

where
M is Sn or Zn;
L is selected from the group consisting of methylformate, ethylformate, n-propylformate, i-propyl formate, n-butylformate, i-butylformate, t-butylformate, and mixtures thereof;
X is Cl and n is 4 when M is Sn; and
X is R and n is 2 when M is Zn,
where
R is $C_{1-8}$ lower alkyl or $C_{2-8}$ lower alkenyl; and
when M is Sn, the ethyl formate ligands are preferably positioned cis to each other.

The preferred tin compound may be prepared by contacting tin tetrachloride in the gas phase with gaseous ethyl formate, preferably in stoichiometric ratio (1:2, respectively). The contact is preferably performed at relatively low temperatures, i.e., at room temperature, and in an inert atmosphere, preferably a dry nitrogen atmosphere. Upon contact of the gas streams, large white crystals of the desired product immediately form. Alternatively, the reactants may be dissolved in a non-polar aprotic solvent such as hexane. The white crystalline product may be recovered by filtration. The compound is characterized by a melting point of 52–53° C.; $^1$H NMR (CDCl$_3$, ppm) 1.33 (t, 3H, CH$_3$), 4.31 (q, 2H, CH$_2$), 8.18 (S, 1H, CH); $^{13}$C NMR (CDCl$_3$, ppm) –0.02, 14.0, 61.5; $^{119}$Sn NMR –823. The IR spectrum showed notable absorbance at 1717cm$^{-1}$ (KBr disk) and 1616 cm$^{-1}$ (gas phase). X-ray crystallography indicates a molecule with ethyl formate ligands occupying cis positions relative to each other.

The obtained compound is surprisingly different from the tin chloride/ethyl formate complex of the same empirical formula prepared by dissolving tin tetrachloride and ethylformate in excess ethylformate, as reported by Paul, et al., Ind. J. Chem. 7, 377–8880 (April 1969). The compound prepared by Paul et al. is apparently a different compound, as evidenced by a quite different melting point of 63° C. No structural assignment (NMR; IR; Crystallography) was reported, and thus the different melting point may be reflective of an addition reaction across the O=C bond of the formate ester rather than the complexes of the present invention. However, the configuration does not appear to be important in coating processes.

The zinc CVD precursors are preferably prepared by complexing the corresponding dialkylzinc compound with ethylformate in non-reactive solvent. Suitable non-reactive solvents include aromatic and aliphatic hydrocarbons, preferably hexane. The reaction may take place at room temperature or at higher temperatures, but advantageously is performed at lower temperatures such as 0° C. The ethylformate is added gradually to the solution of dialkylzinc in solvent. The reaction is exothermic, and the resultant product is obtained as a clear homogenous solution in solvent. The solvent may be separated from the product by distillation if desired.

Titanium halide: alkylformate complexes have also been characterized, and found suitable for preparation of titanium oxide coatings on heated substrates. Both 1:1 and 2:1 alkylformate: titanium tetrachloride compounds exist. These complexes have the formula Ti$_m$X$_{2m}$L$_2$, where m is 1 or 2 and X and L have the meanings set forth previously. Coatings prepared to date from these precursors have required addition of air or oxygen during the coating process to eliminate carbon contamination, when so desired. As with the tin and zinc coatings, the titanium coatings may also be doped. Particularly useful dopants include a wide variety of metal halide: alkylformate complexes. However, metal halides, etc., can be used as well.

In use, the CVD precursors are directed to a hot substrate, i.e., glass, in a single stream. By the term "single stream" is meant that separate streams of reactants are avoided. Multiple "single streams" may be employed to form coatings, for example on large area substrates, or to form multiple coatings with increased total coating thickness or different dopant concentration. The substrate is coated at any convenient pressure that allows the CVD precursor to volatilize, preferably at normal atmospheric pressure or below, i.e., water jet pump vacuum. The substrate temperature is preferably maintained at 400° C. to 700° C., more preferably 450° C. to 600° C., and most preferably about 500–550° C.

Dopant compounds such as group 13 or group 15 halides may be added to the CVD precursor compounds or their solutions to provide any desired level of dopant concentration. Dopants from other groups of elements, i.e., copper, silver, gold, among others, may be used as well. In general, many groups of elements may serve as dopants, particularly groups 4, 12, 13, 14, and 15 of the periodic table of the elements. The electrical resistivity may be varied from the high megohm range to values below 100Ω. Dopant compounds other than halides may also be used, such as ethylformate complexes of boron or aluminum alkyls, etc. An example is the ethylformate complex of trimethylaluminum, as described hereafter.

Deposition rates achieved by the subject invention CVD precursor compounds are high, and film quality excellent. While the CVD compounds are preferably contacted with the hot substrate in the gas phase, other application methods may be used for less demanding applications.

Having generally described this invention, a further understanding can be obtained by reference to certain specific examples which are provided herein for purposes of illustration only and are not intended to be limiting unless otherwise specified.

EXAMPLE 1

A stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of ethylformate and carried, also by a stainless steel tube, into the same flask. Large, white crystalline solids immediately being to form. After one hour the feed stream are terminated and the product collected. $^1$H NMR (CDCl$_3$, ppm) 1.33 (t, 3H, CH$_3$), 4.31 (q, 2H, CH$_2$), 8.18 (S, 1H, CH); $^{13}$C NMR (CD Cl$_3$, ppm) –0.02, 14.0, 61.5; $^{119}$Sn NMR –823. IR (KBr disk), 1717 cm$^{-1}$ and 1616 cm$^{-1}$.

EXAMPLE 2

A solution of ethyl formate (8.5 mL, 0.10 mol) in 10 mL hexane is added under nitrogen atmosphere to a solution of tin tetrachloride (5.84 mL, 0.05 mol) in 10 mL hexane. Within 20 minutes, a white crystalline material precipitated. After 30 min. the reaction mixture was filtered to provide a white crystalline solid (14.2 g, 0.034 mol, 68% of theory). The yield is not optimized.

EXAMPLE 3

To $ZnMe_2$ (1.2 g, 12.6 mmol) at 0° C. is added 20 mL hexane followed by dropwise addition of ethyl formate (2.0 mL, 25 mmol). An exothermic reaction occurs. The resultant dimethylzinc ethylformate complex is obtained as a clear homogenous solution in hexane.

EXAMPLE 4

To $ZnEt_2$ (50.0 mL, 1M in hexane (Aldrich)) ethylformate (8.0 mL, 110 mmol) is added dropwise, producing a slightly exothermic reaction. A clear homogenous solution of the diethylzinc ethylformate complex results.

EXAMPLE 5

To $ZnMe_2$ (3.55 g, 37.4 mmol) cooled to 0° C. is added dropwise $HC(O)OC_2H_5$ (5.9 mL, 74.8 mmol). An exothermic reaction results and is exothermic until the last of the ethyl formate is added. The fmal reaction mixture is a clear homogenous liquid. Excess ethyl formate was removed by passing a slow stream of $N_2$ through the flask and a colorless solid was obtained.

EXAMPLE 6

A stream of $N_2$ gas was passed through a flask containing $ZnMe_2$.2ethyl formate and directed in to a reaction chamber containing a glass substrate held at 325° C. A film of ZnO immediately formed. The thickest portions of the film exhibited $10^6\Omega$ resistances. The same CVD experiments were performed at 350° C., 400° C., 500° C. and 580° C. with the same results.

EXAMPLE 7

A stream of $N_2$ gas was passed through a flask containing a hexane solution of $ZnMe_2$.2ethyl formate and directed in to a reaction chamber containing a glass substrate held at 325° C. A film of ZnO immediately formed. The thickest portions exhibited a resistance of $10^6\Omega$. The same result was obtained at 400 and 550° C.

EXAMPLE 8

A slow stream of a hexane solution of ZnMe.2ethyl formate is poured or sprayed onto a glass substrate held at 350° C. to 550° C. in a reaction chamber in an $N_2$ atmosphere. A film of ZnO immediately formed. The thickest portions of the film exhibited a resistance of $10^6\Omega$. When conducted in air, a spray of the solution on glass substrates at a temperature of 21° C., 50° C. and 100° C. provided a thick coating of ZnO over a thin film having a resistance of $10^6\Omega$.

EXAMPLE 9

To $AlMe_3$ (5.0 mL, 52 mmol) cooled at 0° C. is added hexane (20 mL) followed by the dropwise addition of $HC(O)OC_2H_5$ (4.2 mL, 52 mmol). An exothermic reaction results in a clear homogenous liquid.

EXAMPLE 10

A slow stream of $N_2$ gas was passed through a flask of $ZnMe_2$.ethyl formate and directed in to a reaction chamber containing a glass substrate maintained at 500° C. A separate slow stream of $N_2$ gas was passed through a flask of $AlMe_3$.ethyl formate and combined, at the gas inlet of the reaction chamber, with the gas stream of the zinc complex. After 1 min. a film formed on the glass substrate having a resistance of ca. 300 k$\Omega$.

EXAMPLE 11

A slow stream of $N_2$ gas is passed through a flask containing the CVD precursor of EXAMPLE 1 held above its melting point. The $N_2$ containing CVD precursor in the vapor state is contacted with a glass substrate maintained at 500° C. A uniform, high quality tin oxide coating is obtained.

EXAMPLE 12

To prepare a tin tetrachloride: methylformate complex, a stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of methylformate and carried, also by a stainless steel tube, into the same flask. Large, white crystalline solids immediately begin to form. After one hour the feed streams are terminated and the product collected.

EXAMPLE 13

A tin tetrachloride: methylformate complex is prepared by adding a solution of methylformate (6.2 mL, 0.11 mol) in 10 mL hexane under nitrogen atmosphere to a solution of tin tetrachloride (5.84 mL, 0.05 mol) in 10 mL hexane at 0° C. Within 20 minutes, a white crystalline material precipitated. After 30 min. the reaction mixture was filtered to provide a white crystalline solid (17.5 g, 0.046 mol, 92% of theory). Data. Mp, 90–91° C., $^1H$ NMR ($CDCl_3$, ppm) 8.44 (s, 1H, CH), 3.98 (s, 3H, $CH_3$), $^{13}C$ NMR ($CDCl_3$, ppm) 167.3, 54.1; IR (KBr), 1718 $cm^{-1}$ IR (gas phase), 1766 $cm^{-1}$.

EXAMPLE 14

To prepare an n-propylformate complex, a stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of n-propylformate and carried, also by a stainless steel tube, into the same flask. Large, white crystalline solids immediately being to form. After one hour the feed streams are terminated and the product, an ethylformate tin tetrachloride complex, is collected.

EXAMPLE 15

Preparation of an n-propylformate complex is effected by adding a solution of n-propylformate (9.8 mL, 0.10 mol) in 10 mL hexane under nitrogen atmosphere to a solution of tin tetrachloride (5.84 mL, 0.05 mol) in 10 mL hexane at 0° C. Within 20 minutes, a white crystalline material precipitated. After 30 min. the reaction mixture was filtered to provide a white crystalline solid (19 g, 0.044 mol, 87% of theory). Data. Mp, 63–64° C., $^1H$ NMR ($CDC_3$, ppm) 8.49 (s, 1H, CH), 4.36 (t, 2H, $CH_2$), 1.80 (m, 2H, $CH_2$), 0.99 (t, 3H, $CH_3$); $^3C$ NMR ($CDCl_3$, ppm) 160.7, 64.9, 21.7, 9.8 ppm; IR (gas phase), 1774 $cm^{-1}$.

EXAMPLE 16

To form an i-propylformate: tin tetrachloride complex, a stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of i-propylformate and carried, also by a stainless steel tube, into the same flask. Large, white crystalline solids immediately begin to form. After one hour the feed stream are terminated and the product collected.

EXAMPLE 17

An i-propylformate: tin complex is formed by adding a solution of i-propylformate (10 mL, 0.11 mol) in 10 mL hexane under nitrogen atmosphere to a solution of tin tetrachloride (5.84 mL, 0.05 mol) in 10 mL hexane at 0° C. Within 20 minutes, a white crystalline material precipitates. After 30 min. the reaction mixture is filtered to provide a white crystalline solid (20.2 g, 0.47 mol, 94% of theory). Data. Mp, 100–101° C., $^1$NMR (CDCl$_3$, ppm) 8.49 (s, 1H, CH), 5.30 (m, 1H, CH), 1.40 (d, 6H, CH$_3$),.; $^{13}$C NMR (CDCl$_3$, ppm) 148.3, 54.7, 1.4 ppm; IR (gas phase), 1766 cm$^{-1}$.

EXAMPLE 18

To form a t-butylformate: tin tetrachloride complex, a stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of t-butylformate and carried, also by a stainless steel tube, into the same flask. Large, white crystalline solids immediately begin to form. After one hour the feed streams are terminated and the product collected.

EXAMPLE 19

A t-butylformate: tin tetrachloride complex is prepared by adding a solution of t-butylformate (11.5 mL, 0.10 mol) in 10 mL hexane under nitrogen atmosphere to a solution of tin tetrachloride (5.84 mL, 0.05 mol) in 10 mL hexane at 0° C. Within 20 minutes, a white crystalline material precipitates. After 30 min. the reaction mixture is filtered to provide a white crystalline solid (20 g, 0.043 mol, 86% of theory). Melting point is 55–56° C.

EXAMPLE 20

A stream of dry nitrogen gas (60 mL/min) is bubbled through a container of tin tetrachloride and directed through 18 gauge stainless steel tubing into a 100 mL one-neck round-bottom flask immersed in an ice water bath. A second stream of dry nitrogen (60 mL/min) is bubbled through a bottle of n-butylformate and carried, also by a stainless steel tube, into the same flask. The n-butylformate: tin tetrachloride complex in the form of large, white crystalline solids immediately begins to form. After one hour the feed streams are terminated and the product collected.

EXAMPLE 21

A solution of n-butylformate (11.6 mL, 0.10 mol) in 10 mL hexane is added under nitrogen atmosphere to a solution of tin tetrachloride (5.84 mL, 0.05 mol) in 10 mL hexane at 0° C. Within 20 minutes, white crystalline n-butylformate: tin tetrachoride complex precipitates. After 30 min. the reaction mixture is filtered to provide a white crystalline solid (21.2 g, 0.046 mol, 91% of theory). Data. Mp, 44–45° C., $^1$H NMR (CDCl$_3$, ppm) 8.48 (s, 1H, CH) , 4.37 (t, 2H, CH$_2$), 1.69 (m, 2H, CH$_2$), 1.33 (m, 2H, CH$_2$), 0.87 (m, 3H, CH$_3$); $^{13}$C NMR (CDCl$_3$, ppm) 168.2, 68.2, 29.4, 18.1, 12.8; IR (gas phase), 1766 cm$^{-1}$.

EXAMPLE 22

A 1:1 ethylformate: titanium tetrachloride complex is prepared by slowly mixing TiCl$_4$ (3.30 mL, 30 mmol) with ethyl formate (2.55 mL, 30 mmol) at 0° C. White fumes form, the solution becomes warm, and turns initially into a viscous orange liquid. Overnight the liquid becomes a yellow solid, which is dried in vacuo. The product has a melting point of 53° C. X-ray crystallography determines the structure to be:

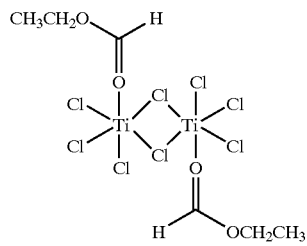

EXAMPLE 23

A 1:2 complex was formed by slowly adding ethyl formate (5.10 mL, 60 mmol) to TiCl$_4$ (3.30 mL, 30 mmol) at 0° C. The yellow liquid TiCl$_4$ turns into a viscous orange liquid. During the reaction of white fumes are produced. The reaction is exothermic. $^1$H-NMR (CDCl$_3$, 400 MHZ, δ in ppm): 1.381 (t, 6H, CH$_3$), 4.473 (q, 4H, CH$_2$), 8.519 (s, 2H, CH). $^{13}$C-NMR (CDCl$_3$, 400 MHz, β in ppm): 14.696, 65.802, 170.546.

After heating the viscous liquid to about 120° C. for 1 hour during a CVD experiment, crystals suitable for single crystal X-ray diffraction form on the cooler part of the flask. The 1:2 complex can be prepared from the reaction of ethylformate with the 1:1 complex.

EXAMPLE 24

When vapor is transported into a reactor chamber both the 1:1 and 2:1 titanium tetrachloride complexes of Examples 22 and 23 provide films of TiO$_2$ (rutile) on glass substrates held at 450° C. to 620° C. The films are contaminated with carbon, but adding oxygen or air to the vapor stream removes all traces of carbon impurities from the films.

EXAMPLE 25

Vapor streams of the dopant materials AsCl$_3$.HC(O)OCH$_2$CH$_3$, SbCl$_3$.HC(O)OCH$_2$CH$_3$, InCl$_3$.3HC(O)OCH$_2$CH$_3$, YCl$_3$.3HC(O)OCH$_2$CH$_3$, FeCl$_3$.3HC(O)OCH$_2$CH$_3$, TiCl$_4$.2HC(O)OCH$_2$CH$_3$, {TiCl$_4$.HC(O)OCH$_2$CH$_3$}$_2$, ZnR$_2$.2HC(O)OCH$_2$CH$_3$ (where R=CH$_3$ and CH$_2$CH$_3$), in nitrogen gas are combined with a vapor stream of SnCl$_4$.HC(O)OCH$_2$CH$_3$ in nitrogen gas. The combined streams are carried into the reactor chamber containing a heated substrate held at 550° C. Within two minutes the stream of gas was changed to only nitrogen and the sample cooled to room temperature. EDX analysis reveals Sn, O and dopant elements in the SnO$_2$ film deposited.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the chemical vapor deposition (CVD) of a metal oxide film onto a heated substrate, said process comprising
   a) selecting as a metal oxide CVD precursor compound a CVD precursor comprising a compound of the structure $MX_nL_2$ where
   M is Sn or Zn;
   L is selected from the group consisting of methylformate, ethylformate, n-propylformate, i-propyl formate, n-butylformate, i-butylformate, t-butylformate, and mixtures thereof;
   X is Cl and n is 4 when M is Sn; and
   X is R and n is 2 when M is Zn,
   where
   R is $C_{1-8}$ lower alkyl or $C_{2-8}$ lower alkenyl; and
   when M is Sn, the ethyl formate ligands are positioned cis to each other, or a titanium compound which is a 1:1 or 2:1 $C_{1-4}$ alkylformate complex of titanium tetrachloride;
   b) vaporizing said CVD precursor compound to form a CVD precursor vapor;
   c) contacting said CVD precursor vapor with a heated substrate having a temperature in excess of 400° C.; and
   d) cooling said heated substrate contacted with said CVD precursor vapor to obtain a substrate having a film of metal oxide substantially of the formula $MO_{n/2}$ or, when the CVD precursor is said titanium compound, $TiO_2$.

2. The process of claim 1 wherein M is Sn.

3. The process of claim 2, wherein said CVD precursor compound has a melting point of 52–53° C.

4. The process of claim 1, wherein M is Zn.

5. The process of claim 4, wherein R is a $C_{1-4}$ lower alkyl group.

6. The process of claim 4, wherein R is methyl or ethyl.

7. The process of claim 1, wherein prior to vaporization, said CVD precursor compound is admixed with a dopant compound.

8. The process of claim 7, wherein said dopant compound comprises a metal of groups 4, 12, 13, 14, or 15 of the periodic table of the elements.

9. The process of claim 7 wherein said dopant compound is a metal halide or a complex of a metal halide with ethyl formate.

10. The process of claim 1, wherein following vaporization of said CVD precursor compound, a stream of the vaporized CVD precursor compound is admixed with a vapor of a dopant compound.

11. The process of claim 10 wherein said dopant compound comprises a metal of group 13 or group 15.

12. The process of claim 10 wherein said dopant compound is a metal halide or a complex of a metal halide with a $C_{1-4}$ alkyl formate.

* * * * *

UNITED STATES PATENT AND TRADEMARK OFFICE
CERTIFICATE OF CORRECTION

PATENT NO.    : 6,416,814 B1
DATED         : July 9, 2002
INVENTOR(S)   : Dean M. Giolando It is certified that error appears in the above-identified patent and that said Letters Patent is hereby corrected as shown below:

<u>Column 1,</u>
Line 11, please insert the following paragraph:

-- This invention was made with Government support under NREL Subcontract No. ZAK-8-17619-17, Prime Contract No. DE-AC36-98GO10337 awarded by the Department of Energy. The government has certain rights in this invention. --

Signed and Sealed this

Eleventh Day of February, 2003

JAMES E. ROGAN
*Director of the United States Patent and Trademark Office*